May 19, 1959   C. R. BOICEY ET AL   2,886,864
MULTIPLE SHEET GLAZING UNITS
Filed Dec. 27, 1954
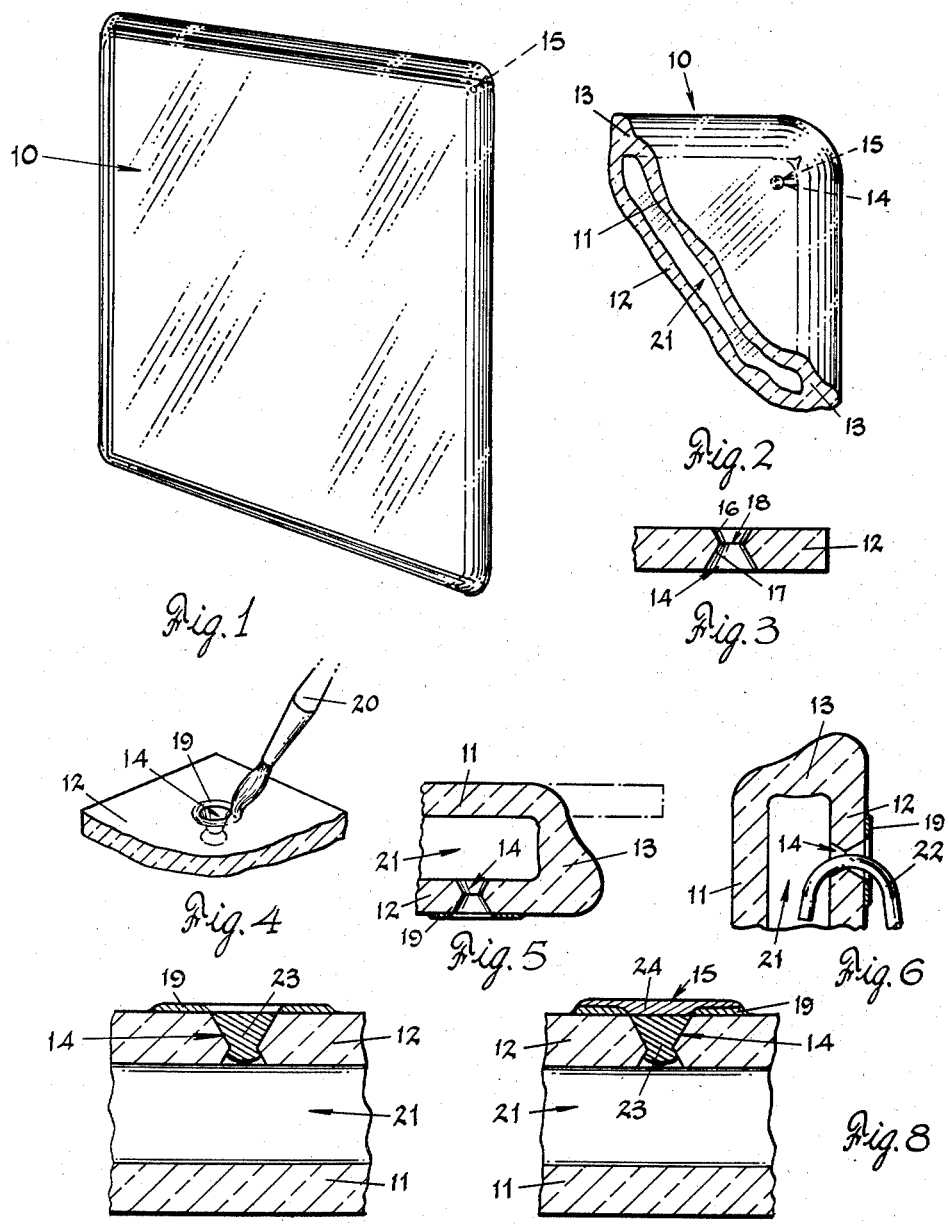
INVENTORS
Charles R. Boicey and
BY William J. Hubbard
Nobbe & Swope
ATTORNEYS

United States Patent Office 2,886,864
Patented May 19, 1959

2,886,864

MULTIPLE SHEET GLAZING UNITS

Charles R. Boicey and William J. Hubbard, Toledo, Ohio, assignors to Libbey-Owens-Ford Glass Company, Toledo, Ohio, a corporation of Ohio Application December 27, 1954, Serial No. 477,912

10 Claims. (Cl. 20—56.5)

This invention relates to glazing units which are made up of two or more sheets or plates of glass joined together entirely around their marginal edges, in spaced face-to-face relation, to provide an hermetically sealed unitary structure. In particular it relates to the dehydrating and hermetic sealing of the enclosed space between the glass sheets of such units.

Hermetically sealed glazing units have become established fixtures in the building trades for the purposes of improved heat insulation as well as for reducing condensation of moisture upon the glass sheets of the unit. As is well known to those skilled in the art, in order to provide such a unit with the desired heat insulating and condensation preventing qualities, it is necessary that moisture-laden air be removed from the space between the sheets of glass making up the unit. This may be done by partial evacuation or by replacing the moist air with dry air or gas which is best suited for the uses to which the unit is to be put.

In order to prevent excess leakage of air, moisture, or other foreign substance into the space after dehydration as well as to retain any particular dry gas trapped therein, the spaced sheets must be permanently joined at their marginal edges prior to the dehydration of the space therebetween, so that said space is hermetically sealed.

Further, to make possible the removal of moisture from the enclosed space between the sheets, with or without substituting dry air or gas therefor, after the sheets have been joined at the marginal edges to enclose said space, a means of access to the space must be provided in the hermetically sealed unit. In addition, after the space has been properly dehydrated, the means of access thereto must be permanently sealed, as were the marginal edges, to again hermetically seal the unit.

The conventional way of providing access to the enclosed space between the glass sheets of glazing units of this general character is to drill or otherwise cut an opening through a portion of the unit, such as for example, the spacing strip, which is of a readily and effectively sealable material. However, when it becomes necessary or desirable to provide a means of access through the glass portion of the unit, as in the case of units made entirely of glass, additional and different considerations are involved since the provision of a permanent hermetic seal to a glass surfaced opening presents some difficult problems.

It is therefore a primary aim of the present invention to provide a multiple sheet glazing unit of the character described in which one of the glass sheets of the unit is provided with an adequately and hermetically sealed dehydration opening, together with a method of preparing and sealing said opening.

Another object of the invention is the provision of a method of sealing a dehydration hole in which a mastic is used in the dehydration hole to form a strong moisture tight seal.

Still another object of the invention is to provide a method of combining the advantages of a metal seal with the advantages of a mastic seal.

Other objects and advantages of the invention will become more apparent during the course of the following description when taken in connection with the accompanying drawings.

In the drawings wherein like numerals are employed to designate like parts throughout the same:

Fig. 1 is a perspective view of an hermetically sealed, all-glass, multiple sheet glazing unit formed in accordance with this invention;

Fig. 2 is an enlarged fragmentary view of one corner of the unit of Fig. 1;

Fig. 3 is a fragmentary, transverse sectional view of the lower sheet for the unit of Figs. 1 and 2, prior to sealing of its marginal edges with those of the upper sheet, and taken along a line through the dehydration hole;

Fig. 4 is a fragmentary perspective view of the sheet of Fig. 3, showing a metallic paste being applied to the rim of the dehydration hole;

Fig. 5 is a fragmentary sectional view of the fused upper and lower sheets of the unit of Figs. 1 and 2, after the coating of metal paste has been fired to the dehydration hole rim;

Fig. 6 is a fragmentary sectional view of the marginally sealed unit as the enclosed space therein is being dehydrated;

Fig. 7 is a fragmentary sectional view of the marginally sealed unit showing a body of mastic filling the dehydration hole and a metallic coating surrounding the hole; and Fig. 8 is a fragmentary sectional view of hermetically sealed unit showing the completed dehydration hole seal.

As may be seen in Figs. 1 and 2, there is shown an all glass unit 10 consisting of upper and lower sheets or plates of glass 11 and 12, respectively, side portions 13 where the marginal edges of said sheets have been fused together, and a dehydration hole 14 which is sealed by a plug 15. In producing such units an upper sheet of relatively large area and a lower sheet of relatively smaller area are arranged in spaced face-to-face vertically aligned relation as best shown in Fig. 5. The marginal edges of the two sheets are then fused together during passage through a suitable sealing furnace not shown. Under the fusing heat the overlapping portion of the edges of the upper sheet 11 shown in broken lines in Fig. 5 sag downwardly so as to fuse with the marginal edges of the lower sheet 12 to form side portions 13.

The technique of providing, specially preparing, and hermetically sealing the dehydration hole in one of the glass sheets of a multiple sheet glazing unit according to this invention is particularly adaptable to the above described procedure. Moreover, when so employed, a part of the procedure necessary to the compositing of the all-glass unit will also serve to perform a necessary part of the preparation of the dehydration hole.

Thus, prior to the assembly of the sheets 11 and 12 in space face-to-face relation for using the marginal edges thereof, a dehydration hole 14 is drilled in lower sheet 12, preferably toward an edge or corner thereof. As best shown in Fig. 3, the drilled hole is preferably substantially venturi-shaped, consisting of opposed upper and lower truncated conical portions 16 and 17, respectively, which are inwardly convergent to form a reduced circular throat portion 18. It can be seen that the lower portion 17, that is, the truncated conical portion which is convergent from the outer (as assembled) surface of sheet 12, is of a greater diameter at its base adjacent said outer surface than is upper portion 16 adjacent the inner surface of said sheet. In practice, with sheets of approximately ⅛ inch thickness, throat 18 is made approximately ¹⁄₁₆ to ⅛ of an inch in diameter and the diameter of the base of lower portion 17 approximately ⅛ to ¼ of an inch, each diameter depending, of course, on the skill of the operator in drilling the hole.

This particular shaped dehydration hole may be drilled by most any of the conventional glass drills using a suitably conically shaped bit, in a manner well known in the glass drilling art. That is, it is common practice to drill holes in glass sheets from both sides or surfaces thereof rather than entirely from one side. In this way, the edges of the hole at both surfaces of the sheets are smooth and uniform and the underside of the sheet is not shattered. Thus, dehydration hole 14 is formed with a relatively small throat portion 18 in a manner which merely involves the carrying forth of established procedure.

In order to prepare the dehydration hole 14 for the subsequent sealing thereof, a special metallic paste or paint such as, for example, a liquid silver frit may be applied to the outer surface of lower sheet 12 surrounding the hole 14 as shown at 19 in Figs. 5, 6 and 7. When such a silver frit is used, it is preferably composed of a low melting glass frit and small silver flakes in a suitable vehicle, such as turpentine, etc.

The glass frit, upon firing of the metallic paste in a manner to be described, will fuse under heat to the glass surface surrounding the rim of the hole 14 to adequately bond the paste thereto. The vehicle provides the metallic paste with the necessary liquid constituency as the glass frit and silver flakes are suspended therein. As well, it acts as a temporary bonding medium in holding the frit and the silver flakes on the surface of the glass preparatory to firing the paste. As will be explained in more detail subsequently, the silver flakes, upon firing of the paste, are bonded to the glass by means of the glass frit, thereby providing a metallic coating to which a suitable body of metal may be bonded in sealing hole 14. Silver frit sold by the Du Pont Company under the designation Du Pont Silver No. 4760 has been found satisfactory for the purposes of this invention, although it usually must be thinned with a suitable solvent, such as isopropyl alcohol.

Although a fired coating of silver flakes in a glass frit has been found most satisfactory for the purposes of this invention, other materials may be used as a metallic paste in specially preparing the hole 14 for subsequent sealing. For example, coatings of thermally unstable metallic salts, such as gold chloride and platinum chloride or other metallic materials which will decompose when heated or fired to give free metal, may be applied to the glass around the rim of the hole. Of course, these metallic salts may also be used with glass frit in a suitable vehicle, as are the free metal silver flakes in the case of the preferred method. As further examples, it is contemplated that a metallic coating satisfactory for the purposes of this invention may be prepared by applying coatings of chloroplatinic acid or silver oxide in suitable vehicles.

Whatever its composition, the metallic paste is applied to the glass surface around the hole 14 to form the rim coating 19 in any convenient manner, as by a small brush 20 (Fig. 4). It is necessary in so applying the paste to see that the coating is neither so heavy that it will pull away from the glass surface nor so thin that after having been fired it will brush entirely away from said surface when burnished in a subsequent operation.

The metallic paste is first allowed to dry, and is then fired onto the glass of the walls by heat. In practicing the invention in connection with the production of all-glass units, in which the marginal edges of spaced sheets are fused together, the heat of fusion of the glass may be used to fire the metallic coating on the dehydration hole. By such a procedure, the metallic paste may be dried after the upper and lower sheets are assembled in operative relation (Fig. 5) prior to the sealing of their marginal edges during passage through a sealing furnace not shown. The paste may be permitted to dry in the atmosphere or the sheets may be placed in a low temperature oven.

In bringing about the firing of the silver frit coating, it has been found that the coating will be properly fired at a temperature of between 1000 and 1200° F. depending on the composition of the coating. At these temperatures a silver frit coating, for example, will be properly fired so that the low-melting glass frit will fuse to the glass surface and the silver flakes will be embedded in the glass frit. Moreover, a great number of the silver flakes will be exposed on the surface of the fired coating. In fact, the flakes in the frit are so numerous that they comprise the substantial portion of the surface of said fired coating so as to form, as used in the claims and as previously mentioned in this description, a "metallic coating." Of course, the term is also applicable to the coatings formed from gold or platinum chloride, chloroplatinic acid, or silver oxide after being fired to the glass surface during the aforementioned fusion of the edges of the glass sheets. That is, as used herein, "metallic coating" has reference to a coating of any of the metallic pastes which may be fired to form the rim coating 19 such that the exposed surface of the coating is entirely or at least substantially composed of the metal from metallic material in the paste.

After the rim coating 19 has been fired, it may be burnished to remove any loose particles so as to place it in condition to form a base for a metal sealing plug to be described hereinbelow. Following the burnishing of the metallic coating, the interior of the unit or enclosed spaced designated by the numeral 21 between the sheets 11 and 12 is purged of any possible moisture.

This dehydration process may be done in a number of ways. For example, as illustrated in Fig. 6, a small nozzle or tube 22 may be projected into the hole 14 and dry air forced from any suitable source (not shown) through the tube and into the space to drive out said moisture. As shown, the nozzle diameter is slightly smaller than the throat portion of the hole such that, as dry air is being forced into the space, the moisture-laden air is being forced out. Alternatively, the partially completed unit may be placed in an evacuating chamber and the moist air evacuated therefrom and dry air introduced into the chamber. In most cases, dehydrated air at normal atmospheric pressure will be satisfactory for filling the space. For other purposes, however, a partially evacuated condition or even a pressure above atmospheric may be desirable. As well, inert gases may be used for some purposes. In any event, any moisture in the space is removed and replaced by dry air or gas in a manner best suited for the purposes to which the unit is to be put.

While the space between the sheets is in a dehydrated condition, a mastic sealing plug 23 formed of, for example, Vistanex and carbon black is forced into the dehydration hole 14 as shown in Fig. 7, Vistanex being a series of polymers formed by the low temperature polymerization of isobutylene and produced by the Standard Oil Co. of New Jersey. The pasty or pliable consistency of the mastic permits a small tail or anchor portion to extend through the small throat portion 18 of the hole to form a double sealing effect through the restricted opening. This mastic offers an advantage over a metallic plug in that it is moisture proof which characteristic has been sometimes difficult to obtain in a metal plug because of the tendency for air and gas bubbles to form in the metal when it hardens from a molten state. Of course other suitable mastics which form a vapor barrier may be used such forms of Butyl rubber and Thiokol.

After the dehydration hole 14 is sealed by the mastic plug 23 an additional seal is formed by placing a metallic seal or plug 24 (Fig. 8) over the mastic seal and in contact wtih the rim coating 19. In order to insure a permanent, firm bond between the metallic coating and a body of metal to be applied over the hole 14 and rim coating 19, it is preferable to use a suitable soldering flux of which there are a large number. One liquid flux we have found to be satisfactory is composed of the following materials, the percentages being by weight: abietic acid 34%, triethanolamine 49.5%, and diethylene glycol 16.5%. This flux may be applied by a brush to the metallic coating.

After fluxing, a globule of the molten sealing metal such as a low-melting point solder, is applied to the flux-treated rim coating 19 by means of soldering iron or other suitable means not shown. Good results have been obtained in the preferred method by the use of a solder composed of 50 parts lead, 30 parts bismuth, and 20 parts tin. Other low-melting point solders may be used although in any event, when sealing a silver coated rim, 1½ to 3 percent by weight of silver should be added so that the solder will be saturated with silver. Unless the solder is saturated with silver, there is a danger of an excess solution of the silver in the metallic coating going into the solder, which would destroy the solder's hermetic bond to the metallic coating. Of course, if the solder is saturated with silver, or at least nearly so, it will not tend to go into solution with the silver in the metallic coating but will adhere thereto. As well, in applying the solder at as low a temperature as is feasible with good working, excess solution is further minimized. However, it is to be understood that were any one of the other metallic pastes used in specially preparing the rim coating 19, it would be necessary for the reasons above mentioned to saturate the solder with the metal which is freed during the firing of the particular paste used.

It will thus be apparent that in addition to the seal formed by the mastic plug 23 in the dehydration hole 14, it is also sealed by metallic coating 24 applied over the mastic plug and bonded to the silver frit 19 around the rim or edges of the hole. In other words, a double seal is formed, one with the mastic plug 23 and the other with the metallic seal 24. Thus, even if the metallic seal is disturbed such as sometimes happens in careless installation, the mastic seal would maintain the interior of the unit in a moisture free condition since any movement of the metal seal would have no effect upon the mastic seal. In this connection, the metallic cover seal would still protect the mastic from any direct contact by a glazing knife or other installation tool. It will of course be apparent that other solders and metals than those shown enumerated may be used, and also that other suitable air and moisture-proof mastics may be used.

It is also to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. A multiple sheet glazing unit having a dehydration opening therein and including spaced sheets of glass sealed together to form a space therebetween, a body of mastic having a portion thereof extending into said opening in contact with the glass along said opening and filling said opening for closing and forming a first seal therefor, and a metallic coating secured to said unit over said mastic body forming a second seal for said opening.

2. A multiple sheet glazing unit having a dehydration opening therein and including spaced sheets of glass sealed together to form a space therebetween, a moisture-proof mastic plug in said opening and sealing said opening, a metallic coating surrounding the rim portion of said opening in contact with an outer surface of said unit, and a body of metal covering said opening and bonded to said coating forming a second seal for said opening.

3. A multiple sheet glazing unit comprising two spaced sheets of glass sealed together to form a space therebetween, one of said glass sheets having an opening therethrough, a body of mastic filling said opening for closing and forming a first seal for said opening and having a portion thereof substantially flush with the outer face of said sheet, and a metallic body over said mastic body secured to the outer face of said unit for forming a second seal for said opening.

4. A multiple sheet glazing unit having a glass seal around the edge thereof, one glass sheet of the unit having an opening therethrough including an enlarged portion in the outer face of the unit and a reduced portion inwardly thereof, a body of mastic forming a seal in said opening for closing said opening and forming a seal therefor and having one portion extending beyond said reduced portion and in contact with the glass, and a metallic material secured over a face of said sheet and covering said opening of mastic and said opening to form a second seal therefor.

5. In a method of producing a multiple sheet glazing unit embodying spaced sheets of glass sealed together adjacent their marginal edges, the steps of forming an opening through one of said sheets, coating the rim of said opening with a metallic paste, firing said paste onto said glass as a metallic coating, dehydrating the air within said space between said sheets, sealing said opening while said space is in a dehydrated condition with a mastic material placed in contact with the glass to form a first seal therefor, and forming a second seal over said mastic seal with a body of metal.

6. In a method of producing a glazing unit embodying spaced sheets of glass joined together at their marginal edges, the steps of forming an opening through one of said sheets, assembling said sheet in spaced face-to-face relation with respect to another sheet, placing a coating of a metallic paste around the rim portion of said opening in contact with a surface of said sheet, and heating marginal edges of said sheets to a temperature to fuse said marginal edges together and fire said paste onto the surface of said opening as a metallic coating.

7. In a method of producing a glazing unit according to the steps defined in claim 6, in which said metallic paste comprises glass frit and silver suspended in a liquid.

8. In a method of producing a glazing unit according to the steps defined in claim 6, the further step of introducing a body of moisture-proof mastic into said opening to seal said opening.

9. In a method of producing a glazing unit according to the steps defined in claim 8, in which a second seal is formed over said mastic seal by placing a body of metal saturated with silver in contact with said metallic coating and over said opening.

10. A method of producing a glazing unit according to the steps defined in claim 9, in which said body of metal for said second seal is saturated with silver such that the metallic coating will not go into excessive solution with said body of metal.

References Cited in the file of this patent

UNITED STATES PATENTS

| 2,621,397 | Black | Dec. 16, 1952 |
| 2,683,906 | Nevins | July 20, 1954 |
| 2,686,342 | D'Eustachio | Aug. 17, 1954 |
| 2,750,637 | Browne | June 19, 1956 |
| 2,784,462 | Fix | Mar. 12, 1957 |